United States Patent
Alvarez et al.

(10) Patent No.: US 7,505,886 B1
(45) Date of Patent: Mar. 17, 2009

(54) TECHNIQUE FOR PROGRAMMATICALLY OBTAINING EXPERIMENTAL MEASUREMENTS FOR MODEL CONSTRUCTION

(75) Inventors: Guillermo Alvarez, San Jose, CA (US); Fabian E. Bustamante, Atlanta, GA (US); Ralph Becker-Szendy, Los Gatos, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 798 days.

(21) Appl. No.: 10/234,889

(22) Filed: Sep. 3, 2002

(51) Int. Cl.
*G06F 17/50* (2006.01)
*G06F 7/60* (2006.01)
*G05B 13/02* (2006.01)

(52) U.S. Cl. .................. 703/14; 703/2; 703/4; 703/13; 700/30; 700/31; 395/500

(58) Field of Classification Search .................. 703/14, 703/2, 4, 13; 700/30, 31; 395/500
See application file for complete search history.

(56) References Cited

U.S. PATENT DOCUMENTS

| | | | | |
|---|---|---|---|---|
| 5,867,397 | A * | 2/1999 | Koza et al. ..................... | 703/14 |
| 6,106,563 | A * | 8/2000 | Stengel et al. ................. | 703/13 |
| 6,175,816 | B1 * | 1/2001 | Flavin et al. .................. | 703/13 |
| 6,330,526 | B1 * | 12/2001 | Yasuda .......................... | 703/2 |
| 6,795,800 | B1 * | 9/2004 | Lee .............................. | 703/2 |

OTHER PUBLICATIONS

Eric Felt et al.; "Testing of Analog Systems Using Behavioral Models and Optimal Experimental Design Techniques". IEEE Computer Society Press, 1994; pp. 672-678.*
Bruno Preiss; "Data Structures and Algorithms with Object-Oriented Design Patterns in C++"; Wiley, Aug. 1998; pp. 352-353, 451; Edition 1.*
Beck et al. "Inverse Problems and Parameter Estimation: Integration of Measurements and Analysis" 1998.*
Begot et al. "D-Optimal Experimental Design Applied to a Linear Magnetostatic Inverse Problem" Mar. 2002.*
Uysal, Mustafa et al., "A Modular Analytical Throughput Model for Modern Disk Arrays," Ninth International Symposium on Modeling, Analysis and Simulation of Computer and Telecommunication Systems (MASCOTS-2001), Cincinatti, Ohio, Aug. 15-18, 2001.

(Continued)

*Primary Examiner*—Kamini Shah
*Assistant Examiner*—Shambhavi Patel (57) ABSTRACT

A technique for programmatically obtaining experimental measurements for model construction. A user provides criteria for the model, such as computational algorithms which characterize behavior of the real system, specifications of experiments to be performed on the real system for collecting experimental data from the real system, an identification of sought parameters which are to be derived from results of the experiments and desired tolerance constraints on the sought parameters. From experimental data collected from the real system and from the provided criteria, the inventive method and apparatus programmatically determines in an iterative loop which additional experiments are to be performed in order to achieve the desired tolerance constraints. After one or more iterations of the loop, the values for the sought parameters are determined within the desired tolerance constraints.

15 Claims, 5 Drawing Sheets

OTHER PUBLICATIONS

Ruemmler, Chris and John Wilkes, "An Introduction to Disk Drive Modeling" IEEE Computer 27(3): Mar. 17-29, 1994.

Shriver, Elizabeth et al., "An Analytic Behavior Model for Disk Drives with Readahead Caches and Request Reordering," Proceedings of SIGMETRICS Joint International Conference on Measurement and Modeling of Computer Systems, Madison, WI, Jun. 1998, pp. 182-191.

Worthington, Bruce L. et al., "On-Line Extraction of SCSI Disk Drive Parameters" Proceedings of the 1995 ACM SIGMETRICS Joint International Conference on Measurement and Modeling of Computer Systems, Ottawa, Ontario, May 1995, pp. 145-156.

Reiser, M. and Lavenberg, S.S. "Mean-Value Analysis of Closed Multichain Queuing Networks" Journal of the Association for Computing Machinery, vol. 27, No. 2, Apr. 1980, pp. 313-322.

Pentakalos, Odysseas I. et al., "Pythia and Pythia/WK: Tools for the Performance Anaylysis of Mass Storage Systems" Software-Practice and Experience, vol. 27, No. 9., pp. 1035-1054, Sep. 1997.

Worthington, Bruce L., "On-Line Extraction of SCSI Disk Drive Parameters," Computer Systems Laboratory, Hewlett-Packard Company (HPL-97-02), Jan. 1997.

Ousterhout, John K., "Tcl and the Tk Toolkit," Addison-WesleyLongman, Inc., 1994.

\* cited by examiner

Transition Costs Matrix

|  | Exp. 1 | Exp. 2 | Exp. 3 | Exp. 4 |
|---|---|---|---|---|
| Exp. 1 | $t_{1,1}$ | $t_{1,2}$ | $t_{1,3}$ | $t_{1,4}$ |
| Exp. 2 | $t_{2,1}$ | $t_{2,2}$ | $t_{2,3}$ | $t_{2,4}$ |
| Exp. 3 | $t_{3,1}$ | $t_{3,2}$ | $t_{3,3}$ | $t_{3,4}$ |
| Exp. 4 | $t_{4,1}$ | $t_{4,2}$ | $t_{4,3}$ | $t_{4,4}$ |

Fig. 5

TECHNIQUE FOR PROGRAMMATICALLY OBTAINING EXPERIMENTAL MEASUREMENTS FOR MODEL CONSTRUCTION

FIELD OF THE INVENTION

The present invention relates to the field of system and device modeling. More particularly, the present invention relates to the field of measuring characteristics of real systems and devices for constructing models.

BACKGROUND OF THE INVENTION

A model is a simplified or idealized representation of a real system that is used to predict the behavior of the real system. A model may be used advantageously during the design or analysis of a real system because the model may provide conclusions about the behavior of the system less expensively or more quickly than the real system.

Models are conventionally constructed by a skilled modeler determining which aspects of the real system are of interest and, thus, are to be represented in the model and which aspects can be ignored in order to simplify the model. Based on this determination, a number of parameters may be identified that characterize the behavior of the real system.

Parameters that characterize a real system may be obtained experimentally by taking measurements from the system itself. However, it is generally desired for the model to be able to predict performance of the real system under conditions or workloads other than those under which the measurements were taken. Otherwise, measurements would need to be taken under all possible operating conditions of the real system. This would be impractical and, thus, would defeat much of the advantage obtained by use of a model. Accordingly, the appropriate parameters must be obtained so that the resulting model is predictive of the performance of the real system.

While some parameters may be measured directly from the real system, other parameters may also be required that can only be measured indirectly. For example, behavior that occurs internally to the system may be impractical to directly measure because measurement points are inaccessible. Moreover, some parameters needed for constructing a model may have no counterpart in the real system. For example, a correction factor applied to partial results may be needed to minimize errors in the model's predictions. Thus, results of direct measurements from different experiments must often be combined in order to determine parameter values that cannot be directly measured.

A further difficulty faced by system modelers is that behavior of the real system is not entirely deterministic. It may also be the case that the workload being serviced by the system is insufficiently characterized, i.e., that factors not controlled by the experimenter vary from one measurement to another and have an impact on the system's observed behavior. This means that repeated experiments under the same workload often provide varying results. Accordingly, these varying results must also be taken into account in attempting to obtain needed parameters.

Thus, a significant difficulty facing the modeler is in knowing which experiments should be performed and how many measurements should be taken for each experiment. By taking too many measurements or the wrong ones, the modeler may waste time and resources. Conversely, by not taking enough measurements, the accuracy of the model may be less than what is required for a given application of the model. As a result of these complexities, model construction is conventionally performed in an ad hoc manner which requires significant skill and experience to render an appropriately predictive model.

Therefore, what is needed is an improved technique for model construction. It is to these ends that the present invention is directed.

SUMMARY OF THE INVENTION

The present invention is a technique for programmatically obtaining experimental measurements for model construction. A user provides criteria for the model, such as computational algorithms which characterize behavior of the real system, specifications of experiments to be performed on the real system for collecting experimental data from the real system, an identification of sought parameters which are to be derived from results of the experiments, and desired error tolerance constraints on the sought parameters. From experimental data collected from the real system and from the provided criteria, the inventive method and apparatus programmatically determines in an iterative loop which additional experiments are to be performed in order to achieve the desired tolerance constraints, and how many additional measurements are to be obtained for each such experiment. After one or more iterations of the loop, the values for the sought parameters are determined within the desired tolerance constraints.

DETAILED DESCRIPTION OF A PREFERRED EMBODIMENT

Figure 1:
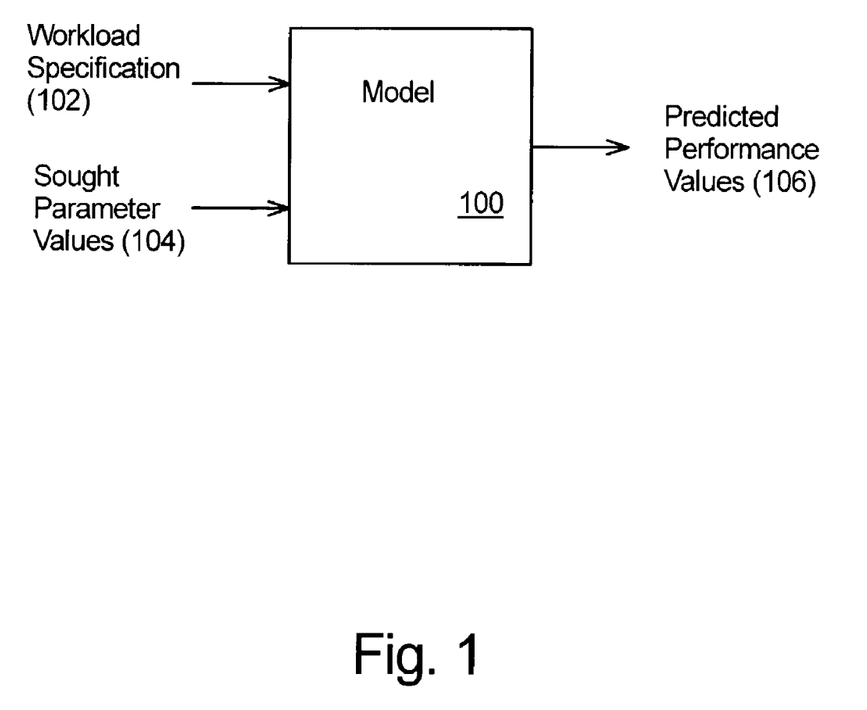
FIG. 1 illustrates a model of a real system or device that may be constructed in accordance with an aspect of the present invention.

FIG. 1 illustrates a model 100 of a real system or device that may be constructed in accordance with the present invention. The model 100 may be either a simulation model or an analytical model or a hybrid of both techniques. For a simulation model, the model 100 includes software and hardware that emulates dynamic and static aspects of the real system or device being modeled. For an analytical model, the model 100 includes a set of formulas or mathematical algorithms that may be performed by general- or special-purpose computer hardware. For either case, the model 100 includes computational algorithms which characterize behavior of the real system. For example, an analytical model may include a set of linear equations. For either type of model, a workload specification 102 and a number of parameter values 104 are applied as inputs to the model 100. The input parameters 104 are referred to herein as "sought" parameter values because aspects of the present invention are directed toward techniques for obtaining them. The model 100 predicts, as outputs, values 106 of desired performance measures as a function of these inputs.

As an example, the model 100 may be of a disk array for data storage, in which case, the workload specification 102 may include the characteristics of a series of storage requests for storing data in the array and for retrieving previously stored information. A predicted performance value 106 may be the access time for that series of storage requests (i.e. the amount of time the data storage system will take to perform the requests). In this example, the sought parameter values 104 characterize the performance of the disk array and, thus, may relate to the amount of time elements within the disk array take to perform their functions.

Figure 2:
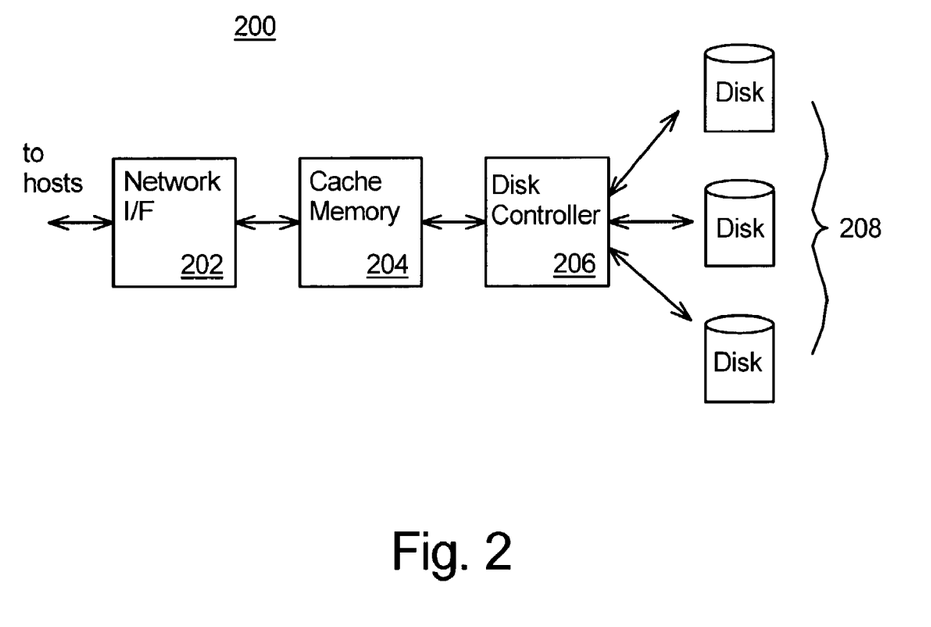
FIG. 2 illustrates an exemplary diagrammatic representation of a real system that may be modeled by the model of FIG. 1 in accordance with an aspect of the present invention.

FIG. 2 illustrates an exemplary diagrammatic representation 200 of a real system that may be modeled in accordance with the present invention. Continuing the example, the diagram of FIG. 2 is of a disk array; however, it will be apparent that another system or device may be modeled in accordance with the present invention. It will also be apparent that a disk array can be represented by elements other than those illustrated in FIG. 2.

The system 200 of FIG. 2 includes a network interface 202 for interfacing the disk array to one or more host computer systems (not shown). The network interface 202 is coupled to a cache memory 204 which stores frequently or recently accessed data. A disk controller 206 coupled to the cache memory 204 controls a number of hard disk drives 208 and provides a communications interface to the hard disk drives 208.

The system 200 of FIG. 2 may be modeled by a simulation model or by an analytical model. For example, an analytical model may include a set of linear equations. It will be apparent, however, that an analytical model may be implemented by formulas or computational algorithms that are not linear equations.

A first linear equation for predicting the read access time when requested data is present in the cache memory 204 (i.e. a cache hit) may be given as follows:

$$T\text{access(cache hit)} = T\text{network1(request size)} + T\text{lookup} + T\text{cache(access size)} + T\text{network2(access size)} \quad (1)$$

where Taccess(cache hit) is the total access time, which may be a desired performance parameter to be predicted; Tnetwork1(request size) is the time required to communicate a data request from a host to the cache memory 204 via the network interface 202, as a function of the request size; Tlookup is the time required to check the cache 204 to determine whether the requested data is present in the cache 204; Tcache(access size) is the time required to read the data from the cache, as a function of the access size (i.e. the quantity of data requested, which may be different from the request size depending on the storage device); and Tnetwork2(access size) is the time required to communicate the requested data from the cache to the host via the network interface 202, as a function of the access size. In what follows, items such as Tnetwork1(request size), Tlookup, and Tcache(access size) will be referred to as parameters.

A second linear equation for predicting the access time when the requested data is not present in the cache (i.e. a cache miss) may be given as follows:

$$T\text{access(cache miss)} = T\text{network1(request size)} + T\text{lookup} + T\text{controller(request size)} + T\text{disk(access size)} + T\text{network3(access size)} \quad (2)$$

where Taccess(cache miss) is the total access time, which may be a desired performance parameter to be predicted; Tnetwork1(request size) is the time required to communicate a data request from a host to the cache memory 204 via the network interface 202, as a function of the request size; Tlookup is the time required to check the cache 204 to determine whether the requested data is present in the cache 204 (even though it is not present, the disk array must still establish that fact); Tcontroller(request size) is the time required to process the request by the disk controller 206, as a function of the request size; Tdisk(access size) is the time required to read the data from the disks, as a function of the access size; and Tnetwork3(access size) is the time required to communicate the requested data from the disks 208 to the host via the network interface 202, as a function of the access size.

From equations (1) and (2), it can be seen that the access time Taccess is dependent upon whether the requested data is present in the cache memory 204. This uncertainty may be modeled as a probability that any particular request will result in a cache hit. Accordingly, a more complete model of the disk array may be provided by combining equations (1) and (2), as follows:

$$T\text{access} = \bar{h}[T\text{access(cache hit)}] + (1 - \bar{h})[T\text{access(cache miss)}] \quad (3)$$

where $\bar{h}$ is the probability that requested data is present in the cache 204 and $(1 - \bar{h})$ is the probability that requested data is not present in the cache 204.

Taccess in equation (3) may be a predicted value 106 output of the model 100 of FIG. 1. The parameters on the right-hand side of equations (1) and (2) are sought values 104 which may be inputs to the model 100. The workload characteristics 102 request size, access size, and $\bar{h}$ may also be inputs to the model 100.

Sometimes, parameter values may be obtained directly through experimental techniques. For example, for measuring Taccess(cache hit), an experiment may be designed to read data that is known to be present in the cache 204. And, for measuring Taccess(cache miss), an experiment may be designed to read data that is known to be absent from the cache 204. Thus, Taccess(cache hit) and Taccess(cache miss) may be measured directly under various workloads. However, because measurement points for other parameters, such as Tlookup and Tcontroller(request size), may not be accessible, it may be impractical or even infeasible to measure them directly. Further, certain parameters, such as Tlookup, are present in both equations (1) and (2) while other parameters are present in only one of the equations (e.g., Tcontroller is present only in equation (2)). In addition, some parameters may be available from a manufacturer of a particular device. For example, a hard disk manufacturer may provide the parameter Tdisk as part of its product specifications.

Accordingly, a number of experiments may be designed and other linear equations may be developed in order to be able to solve the equations for parameters that cannot be directly measured or obtained through other means. In general, to solve for all sought parameters, at least one linear equation is required for each sought parameter.

In practical, real-world systems the values of measurable parameters can be experimentally determined within a non-zero error margin. Due to environmental factors not controlled by each experiment, and to the possibility of errors during measurement, values obtained through experimentation will be samples of a random variable. The value being measured can be seen, in statistical terms, as a characteristic of a (typically infinite) population that can only be approximated through a statistic—i.e., by a measurable characteristic of the finite sample taken by each experiment. Many such statistics may be used. Without loss of generality, we concentrate on describing how to bound the error in estimating the mean values of parameters; but this method can be readily adapted to any other statistic that converges to more useful values as more measurements of each experiment are incrementally taken.

In what follows, we begin by describing the case of a single, directly-measurable parameter. For a parameter, a population mean ($\mu$) and population variance ($\sigma^2$) are characteristics of a random variable. Given that measurement results can typically take an infinite possible number of values, this is equivalent to measuring characteristics of a population of infinite size. A sample mean ($\bar{x}$) and sample variance ($s^2$) are their corresponding statistics obtained from a finite number of measurements. Each sample mean ($\bar{x}$) is an estimate of the population mean ($\mu$). Similarly, each sample variance ($s^2$) is an estimate of the population variance ($\sigma^2$).

Since statistics cannot perfectly estimate the values of characteristics of the whole population from a finite number of samples, the best that can be obtained is an interval such that there would be a high probability, $(1-\alpha)$, that the population mean would be included in it. This interval is known as the confidence interval for the population mean. Here, $\alpha$ is referred to as the significance level, $100(1-\alpha)$ is referred to as the confidence level and $(1-\alpha)$ is referred to as the confidence coefficient. The confidence level may be expressed as a percentage and is typically near 100%, while the significance level $\alpha$ may be expressed as a fraction and is typically near zero.

As is well known from statistics, for large samples, i.e. greater than 30 measurements, a $100(1-\alpha)\%$ centered confidence interval for the population mean may be given by:

$$\bar{x} \pm z_{1-\alpha/2} * s/\sqrt{n} \qquad (4)$$

where n is the sample size, $z_{1-\alpha/2}$ is the $(1-\alpha/2)$-quantile of a unit normal variate, and s is the positive square root of $s^2$.

For samples of smaller size, the confidence interval may be given by:

$$\bar{x} \pm t_{[1-\alpha/2, n-1]} * s/\sqrt{n} \qquad (5)$$

where $t_{[1-\alpha/2; n-1]}$ is the $(1-\alpha/2)$-quantile of a t-variate with n−1 degrees of freedom.

The previous equations determine the width of the confidence interval centered on $\bar{x}$, for a given sample. In addition to $\alpha$, the modeler must also specify a maximum width for the interval, so that the present invention can continue taking new measurements until the confidence intervals become narrow enough. A way of stating a confidence interval is through an error coefficient $\epsilon$ between zero and one. Thus, a pair ($\epsilon$, $\alpha$) means that the modeler desires at least a $(100*(1-\alpha))\%$ certainty that there is, at most, a difference of $(100*\epsilon)\%$ between the real value and the approximation obtained through repetitive measurements. We define $$\delta = \bar{x} * \epsilon \qquad (6)$$

in such a way that ($\bar{x} \pm \delta$) is the confidence interval within which the population mean $\mu$ falls with probability $(1-\alpha)$. Based on an estimated standard deviation, the number n of measurements needed may be computed from:

$$n = \lceil t^2 * s^2 / \delta^2 \rceil \qquad (7)$$

for samples of less than 30 measurements, where t is the value for the two-sided Student's t statistic with (n−1) degrees of freedom at the desired level of confidence. For larger samples, the t-variate can be replaced by the unit normal variate z to obtain:

$$n = \lceil z^2 * s^2 / \delta^2 \rceil \qquad (8)$$

It is important to note that the computations described above relate n, $\delta$ and $s^2$ for a given sample of size n that has already been measured. Thus, obtaining the needed measurements tends to be a circular problem; a required sample size n is needed before the measurements are taken, however, measurements must be taken in order to compute $\delta$ and $s^2$ (which are needed to compute n). This invention breaks the circularity by obtaining initial ("seed") values for $\delta$ and $s^2$ based on an initial sample size $n_0$, and then iteratively refining this initial estimation by obtaining additional samples as necessary.

Thus, in accordance with the method presented by this invention, experiments are performed iteratively in order to measure parameters on the real system and the results are analyzed to compute values for sought parameters. In addition, a determination is made as to whether a desired, modeler-specified error tolerance has been achieved for each sought parameter. Based on the results of prior experimental runs, additional runs are performed to obtain additional measurements that are then incorporated into the values computed for the sought parameters. The additional runs are selected so as systematically to reduce errors in the sought parameters thereby quickly and efficiently obtaining sufficient experimental data to provide the desired error tolerance constraints. When the desired error tolerances are finally achieved, the computation stops and no further measurements are taken.

In other words, the technique presented here involves taking a fixed initial number of measurements $n_0$ in order to obtain estimates of $\bar{x}$ and $s^2$, the sample mean and variance. Then, a needed number of measurements, $n_j$, is determined for the desired error tolerance (j is initially 1). One or more additional experiments are performed to obtain the additional $(n_j - n_{j-1})$ measurements and the statistics are re-computed. Based on the recomputed statistics, a desired level of error tolerance may be obtained or, if necessary, the process of computing a number of additional experiments to be performed and taking additional measurements is repeated until the desired levels are obtained.

In the example, access times of the disk array for a given I/O request size were directly measurable. Thus, the technique described above is suitable for sought values that are directly measurable. Many parameters, however, are not directly measurable but, instead, must be computed from the outcome of other measurable experiments. Such sought values are referred herein to as composite parameters. For example, cache lookup (Tlookup) is not generally directly measurable, but it may be computed indirectly as a difference between the time needed to read data that is not in cache while having the cache "on," Read(cache on) and the time needed to read the same data with the cache "off," Read(cache off). The directly measurable parameters, Read(cache on) and Read (cache off), are referred to herein as component parameters of the composite parameter, Tlookup.

We now proceed to describe the case in which there is a single sought parameter, and it is not directly measurable; after that, we present an extension to solving simultaneously for multiple mutually-dependent measurable and not directly-measurable parameters. It is still necessary to deal with confidence intervals when determining the value of a not directly-measurable parameter, for its value depends on those for measurable parameters; error margins will, therefore, propagate from measurable to not directly-measurable parameters during the process of model construction. Let $x_1$, $x_2$, ..., $x_k$ be independent random variables having normal distributions with means $\mu_1$, $\mu_2$, ..., $\mu_k$, and variances $\sigma_1^2$, $\sigma_2^2$, ..., $\sigma_k^2$, respectively (these variables represent measurable parameters). Sample values of the i-th random variable can be obtained by running the corresponding experiment i, for i=1, ..., k. Furthermore, let the random composite variable y (i.e. a sought, not directly-measurable parameter) be defined as:

$$y = \alpha_1 * x_1 + \alpha_2 * x_2 + \ldots + \alpha_k * x_k \quad (9)$$

where $\alpha_1, \alpha_2, \ldots, \alpha_k$ are contribution weights to the composite y, of each component $x_1, x_2, \ldots, x_k$. Then it is well known in statistics that the composite parameter y has a normal distribution with mean given by:

$$\mu = \alpha_1 * \mu_1 + \alpha_2 * \mu_2 + \ldots + \alpha_k * \mu_k \quad (10)$$

and variance given by:

$$\sigma^2 = \alpha_1^2 * \sigma_1^2 + \alpha_2^2 * \sigma_2^2 + \ldots + \alpha_k^2 * \sigma_k^2 \quad (11)$$

And the statistical estimators of the characteristics of the population for y, can be computed as:

$$\bar{y} = \alpha_1 * \bar{x}_1 + \alpha_2 * \bar{x}_2 + \ldots + \alpha_k * \bar{x}_k \quad (12)$$

and $$s^2 = \alpha_1^2 * s_1^2 + \alpha_2^2 * s_2^2 + \ldots + \alpha_k^2 * s_k^2 \quad (13)$$

According to equations (12) and (13), the statistics for the composite variable y can be computed from those of its components. Thus, k different experiments are required, each of which measures values for one of the component variables $x_1, x_2, \ldots, x_k$. This is in contrast to directly measurable parameters, which may be determined from a single experiment (for which multiple measurements are taken). In the example, the relationship between Tlookup, Read(cache on) and Read (cache off) may be given as:

$$Tlookup = (+1) * Read(cache\ on) + (-1) * Read(cache\ off) \quad (14)$$

Because two component parameters are needed to determine the composite parameter, then two different experiments are required (k=2).

In what follows, we assume that, if needed, the original system of linear equations has already been solved before applying method 300. Therefore, all sought parameters 104 are already expressed as linear combinations of directly-measurable parameters. This transformation can be accomplished by many well-known methods, such as Gaussian elimination. After this step, the composite parameter is expressed as a linear function of only measurable parameters, as in equation (9). We also assume that an invocation of method 300 (FIG. 3) determines the value of a single sought, not directly-measurable parameter; the generalization to the case of simultaneously solving for multiple sought parameters is discussed later.

Figure 3:
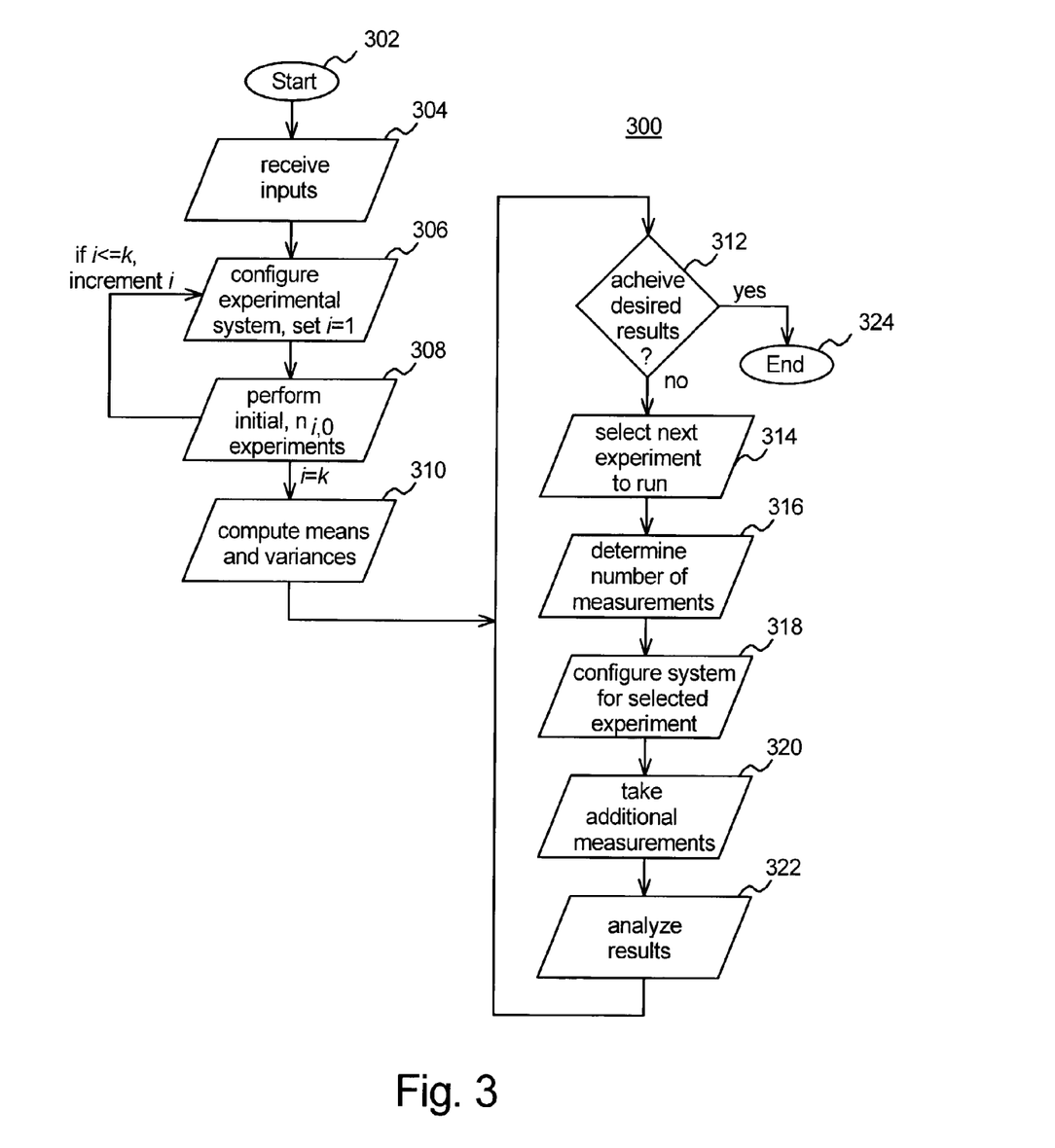
FIG. 3 illustrates a flow diagram of a method of obtaining parameter values for model construction in accordance with an aspect of the present invention.
Figure 4:
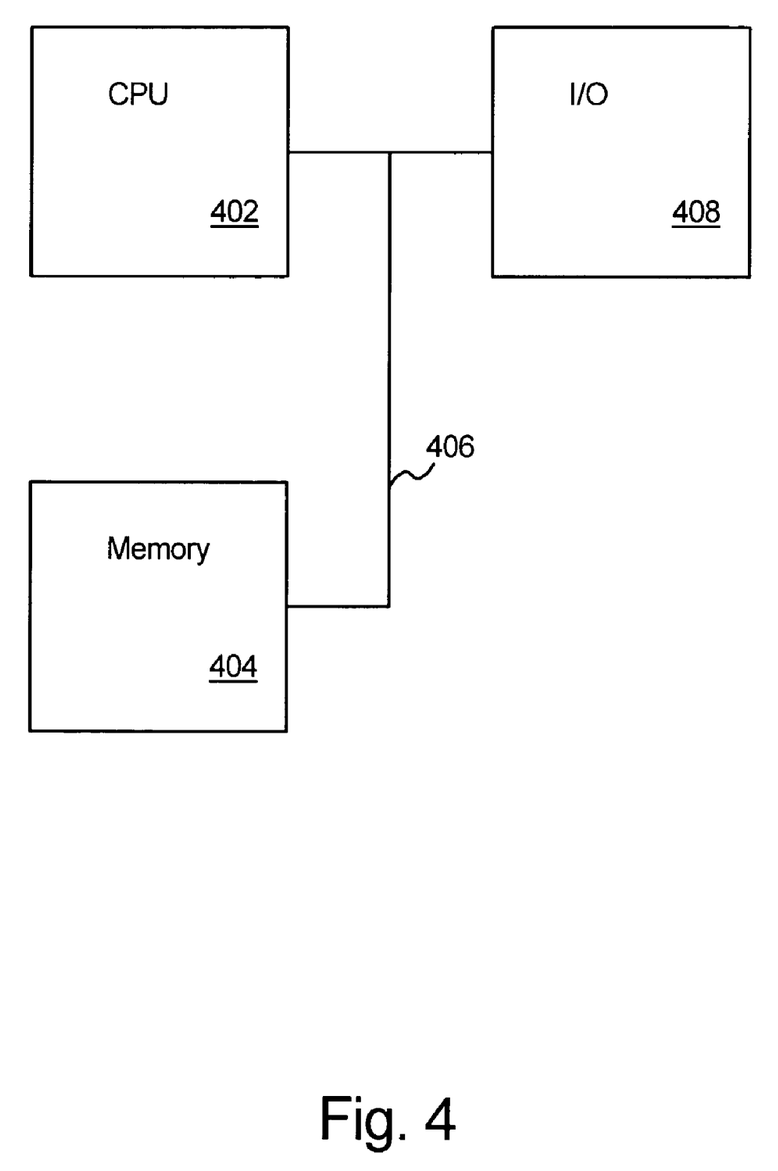
FIG. 4 illustrates a general-purpose computer system by which aspects of the present invention may be implemented.

FIG. 3 illustrates a flow diagram of a method 300 for experimentally obtaining a parameter value in accordance with an aspect of the present invention. FIG. 4 illustrates a block schematic diagram of a general-purpose computer system 400 by which the present invention, including portions of the flow diagram 300, may be implemented. The computer system 400 may include a general-purpose processor 402, a memory 404, such as persistent memory (e.g., a hard disk for program memory) and transitory memory (e.g., RAM), a communication bus 406, and input/output devices 408, such as a keyboard, monitor and mouse. The computer system 400 is conventional. As such, it will be apparent that the system 400 may include more or fewer elements than shown in FIG. 4 and that other elements may be substituted for those illustrated in FIG. 4.

Program flow begins in a start step 302 and moves to a step 304 in which inputs are received. These inputs may be developed by a user of the invention (e.g., a model designer) and may include, for example, an identification of a sought quantity, one or more scripts for experiments that may be performed for (indirectly) measuring the sought quantity, and $\epsilon$ and $\alpha$ as defined above. These inputs may then be received by the system 400 of FIG. 4 for further processing, as explained below.

In the example, a sought quantity may include a parameter from equations (1) or (2). For example, the sought quantity may be Taccess(cache hit) as a linear function of request size. It will be apparent that this linear dependence is purely exemplary; those skilled in the art will recognize that many other relationships are possible. For Taccess(cache hit), a corresponding experiment may specify that Taccess is measured for various different request sizes under conditions that ensure that requested data is present in the cache memory 204 (i.e. a cache hit). Another experiment, assuming the sought quantity is Taccess(cache miss), may specify that Taccess is measured for various different request sizes under conditions that ensure that requested data is not present in the cache memory 204 (i.e. a cache miss). Yet another experiment may designate that some number of requests are made under an arbitrary workload (e.g., having random request sizes, and random frequencies of read and write operations to random memory locations); the resulting numbers of cache misses and cache hits may be used in an attempt to ascertain the probability $\bar{h}$ from equation (3), above.

In addition, desired tolerance constraints for the sought parameter are specified. For example, the specified tolerance constraints may be included in the inputs received in the step 304. The tolerance constraints may include, for example, an error tolerance and confidence interval for each sought parameter. As explained herein, the system 400 determines how many times to perform the experiment in order to achieve the desired tolerance constraints.

Thus, from the step 304, program flow may move to a step 306 in which the experimental system (i.e. the real system from which measurements are to be taken) is configured for performing the designated experiment. The user may physically set up the experimental system in the step 306, as necessary. This may include powering on or off certain devices and other physical configuration acts. In the example, the experimental system is a disk array, though another system or device may be used.

From the step 306, program flow moves to a step 308 in which an initial set of $n_{i,0}$ measurements are taken for each experiment i, where i=1, ..., k. For example, a predetermined initial number (e.g., thirty) of measurements of the access time, Taccess(cache hit), for each of several request sizes may be performed. For taking this set of measurements, the experiment is performed in step 306 according to its respective script. Thus, in the example, an experimental set up for measuring access times assuming a cache hit may configure the disk array so as to ensure that requested data will be present in the cache. The script may exercise the disk array by issuing appropriate requests of varying size. Note that the initial number of times each experiment is run may be same as for the other experiments, but need not be the same. Program flow may return to step 306 for each experiment i, until all the experiments are performed (i.e. until i=k).

In step 310, the results of the experiments performed in the step 308 may be analyzed to compute a statistical measure, such as a sample mean $\bar{x}_i$ and variance $s_i^2$ for the sample corresponding to each experiment i. Then, the mean and variance for the sought parameter y may be computed as per equations (12) and (13)—i.e., as a function of the means and variances for each of the measured values that contribute to the sought value. For example, the system 400 may perform this computation step in accordance with a stored software program.

In the example, a sample mean and variance may be computed for each of the several request sizes. Thus, in step 310, an estimate of the population mean may be computed based on the finite number of samples taken in step 308. In a step 312, a determination may be made as to whether the desired tolerance constraints on the sought parameter are met by the values computed in step 310. Step 312 may evaluate equation (4) or (5) to determine whether the modeler-specified tolerance constraints have been achieved. If that is not the case, program flow moves to a step 314.

In the step 314, a determination may be made as to which of the k experiments should be run to get additional measurements. In one embodiment, the experiments may simply be performed in a predetermined order. For example, in steps 308 and 320, measurements for component variable $x_1$ may be performed first, and then measurements for component variable $x_2$ may be performed, and so forth, such that measurements for component variable $x_k$ are performed last, and then starting again with $x_1$.

However, this embodiment ignores three characteristics of real systems. First, additional measurements for different experiments have different effects on the confidence interval of the sought parameter; some will lead to a faster convergence than others. Second, taking a single extra measurement (assuming the system has already been correctly configured) has different costs for different experiments, be it in terms of effort, time, or other associated costs; it may be more convenient to take a given number of extra measurements for one experiment than for another one. Third, because different experiments are to be performed, the experimental system will generally need to be reconfigured between different experiments. This reconfiguration task may be performed in the step 318 prior to taking measurements for each experiment. For example, the experiments for each of the component parameters, Read(cache on) and Read(cache off), require that the cache memory 204 (FIG. 4) of the experimental system is appropriately turned on or off. In some circumstances, considerable effort may be required to configure and pre-condition the experimental system between experiments. Thus, in another aspect of the present invention, the effort, time or other costs associated with reconfiguring and pre-conditioning the experimental system (referred to herein as "transition costs") may be taken into account when determining in which order the different experiments are to be performed. The cost of reconfiguring and pre-conditioning the experimental system will depend upon its current configuration, and, thus, which experiment was previously run.

Figure 5:
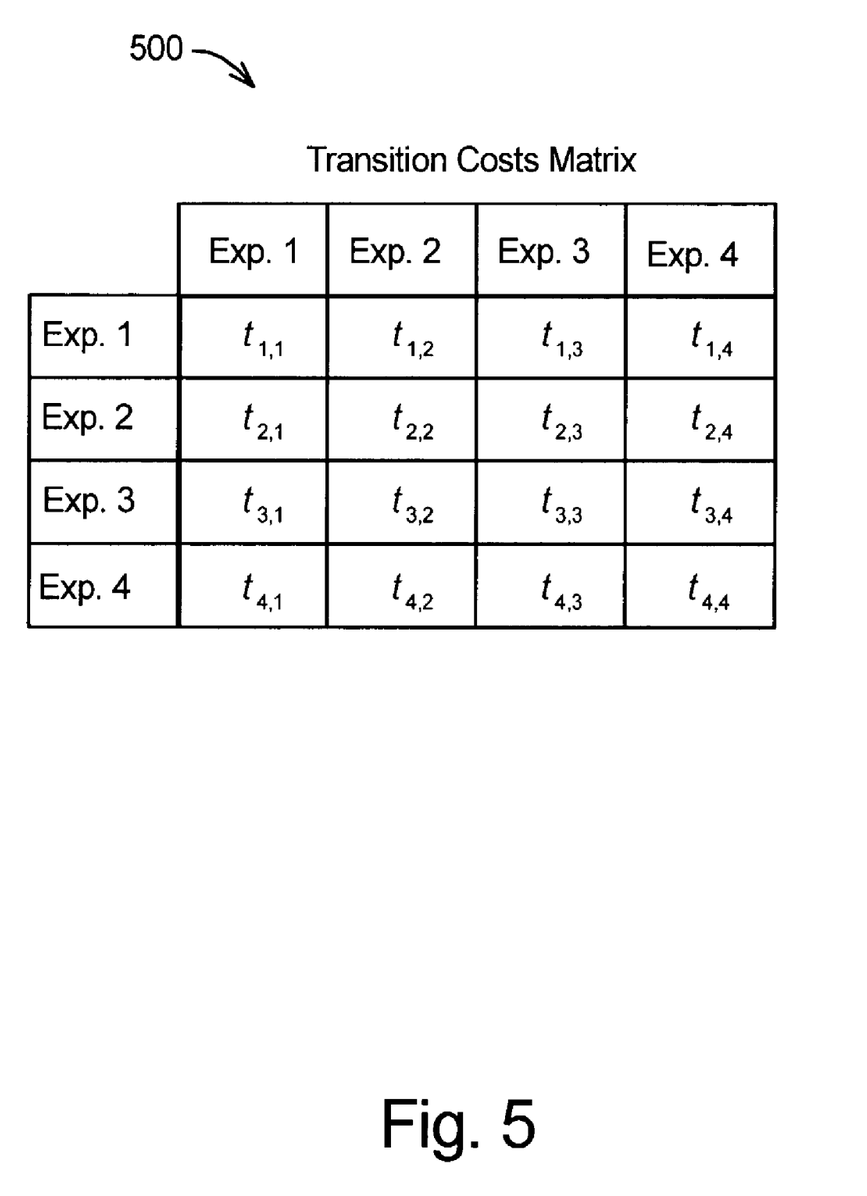
FIG. 5 illustrates a transition costs matrix in accordance with an aspect of the present invention.

Thus, a transition costs matrix may be developed. FIG. 5 illustrates an exemplary transition costs matrix 500 in accordance with an aspect of the present invention. The entries in the matrix 500 may be provided by the user along with the other inputs provided in step 304 and may be stored, for example, in the memory 404 (FIG. 4). The entries may also be determined or estimated empirically, in the course of running experiments, e.g., by keeping track of how long each executed transition takes. In such a case, the initial values in the transition matrix may be set to 0, to encourage the transitions costs to be explored, or a nominal default value, such as 1, or they may be specially marked as "not yet known". The sample matrix 500 of FIG. 5 is for a composite variable having four component variables and, thus, four different experiments are to be run, one for each component variable. Each entry in the matrix 500 is given as $t_{l,m}$ to indicate the transition cost t from experiment l to experiment m. Thus, for example, the cost of transitioning from a first experiment (Exp. 1) to a second experiment (Exp. 2) is represented as $t_{1,2}$. The values for $t_{1,1}$, $t_{2,2}$, $t_{3,3}$ and $t_{4,4}$ may be zero if the corresponding experiment leaves the experimental system in same condition at the end of the experiment as it was in at the beginning of the experiment. Otherwise, these values may be non-zero if pre-conditioning is required between successive runs of the same experiment.

We proceed to describe an alternative embodiment of step 314, that considers the three factors mentioned above (speed of convergence, cost per additional measurement, and cost of reconfiguration) in order to minimize the total amount of effort spent in determining values for the sought parameter, in a heuristic way. At any time that a desired tolerance constraint has not yet been reached, a next experiment, and the number of times it is run, may be individually selected to be performed, and the number of measurements to be taken by that experiment may be computed, in a way that is expected to rapidly and efficiently decrease the confidence interval for the composite variable.

More particularly, priorities may be assigned to the experiments and the experiments performed in accordance with a priority queue. The priority for each experiment is preferably based on the expected effect of each additional measurement of the experiment on the variability of the composite variable. The priority may also be based on costs (e.g., transition costs and/or per-run costs) associated with the experiment. The priority of a given experiment is preferably a function, of one or more of: the contribution to the variability of the composite variable; the cost per measurement of the experiment; and the cost of the setup required by the experiment.

The contribution or benefit $b_i$, per unit of an experiment i, may be given as:

$$b_i = \frac{A_i * (s_f - s_T)/n_s}{s_T} \quad (15)$$

where $s_T$ is the standard deviation of the total set of measurements up to and including the last batch, $s_f$ is the previous $s_T$ (i.e. the standard deviation computed not taking into consideration the measurements from the last batch of measurements), $n_s$ is the number of measurements in the last batch ($n_T = n_f + n_s$), $A_i$ is the normalized absolute value of the coefficient of the experiment i in the equation defining y. Thus, $A_i$ may be given as:

$$A_i = \frac{|a_i|}{\sum_{j=1}^{k} |a_j|} \quad (16)$$

For the initial case, the size of the first subset of measurements, $n_f$ may be computed as:

$$n_f = [n_0/2] \quad (17)$$

(where $[n_0/2]$ is the integer part of $n_0/2$) though another "seed" number may be selected. The size of the second set of measurements, $n_s$ is what is "left" from the initial set of measurements. Thus, $n_s = n_0 - n_f$. After this, the first subset $n_f$ is the total number of measurements taken so far with the exception of the last batch; the remaining $n_s$ measurements are the ones taken in the last batch.

In this way, the benefit of each measurement for an experiment is refined over time as more measurements are taken. Also, experiments are prioritized by how much the computed standard deviation was reduced by the most recent runs of the experiment (i.e. the measurements of the last batch). The order of the standard deviations in the weight function of equation (15) is based on an expectation that the standard deviations will decrease with each additional measurement. The division by $s_T$ normalizes the contribution of each measurement.

The priorities of experiments may be based solely on the contribution of benefit of each experiment. However, costs are preferably also taken into consideration. To incorporate the transition costs between experiments and the cost per measurement of an experiment, another normalization operation may be performed. More particularly, let experiment p be the experiment chosen in the last prior invocation of step 314, or the last experiment performed in step 308 if step 314 has never been invoked so far. Let $c_i$ be the cost per measurement of an experiment, not including set-up costs. Thus, $b_i$ and $c_i$ are on a per-measurement basis for an experiment, while the transition cost $t_{p,i}$ is incurred once per batch of measurements. Similarly to the transition costs, the cost per measurement of an experiment may be provided to the system 400 (FIG. 4) by the user.

Let $b_i'$, $c_i'$ and $t_{p,i}'$ be the result of normalizing b, $c_i$ and $t_{p,i}$ respectively by dividing each by their respective maximum value over all experiments. A per-measurement cost-benefit value may be given as:

$$w_i = bw*b_i' - cw*c_i' - tw*t_{p,i}' \quad (18)$$

where the contribution and costs are combined after being multiplied by an associated weight, bw, cw, and tw. According to equation (18), the expected benefit of an experiment is offset by its costs. The weights can be adjusted as desired, such as by the user, however, the sum of these weights is preferably equal to one.

The benefit and cost per unit of measurement for a given experiment only needs to be re-calculated when new measurements are obtained with this experiment. On the other hand, the cost of transition will depend on the last experiment run, so the contents of the entire priority queue may be recomputed after each batch is finished.

After priorities are assigned to all experiments, in step 314, an experiment having highest priority in the queue may be selected. Once that experiment has been run, it may be removed from the priority queue until one or more of the other experiments have been performed before returning it to the queue. This avoids the possibility that the experiment will be re-selected at least until it is returned to the queue. Alternately, after the chosen experiment has been run for the number of times computed, its priority may be re-computed and the experiment may be reinserted into the queue according to its new priority. Thus, if the last run of an experiment was helpful in quickly achieving the desired error tolerance, the experiment will be assigned a higher priority and will be more likely to be run again. Conversely, an experiment that is not particularly helpful will be assigned a lower priority and will be less likely to be selected again.

Next, the number of measurements to take for the experiment chosen in step 314 is determined in a step 316. Because that number is dependent on each selected experiment, each experiment may potentially be run a different number of times than the others, both for the initial and subsequent batches of measurements. Then, the needed number of measurements, $n_{p,j}$, for experiment p is determined (where j is initially 1) from the desired error tolerance for the composite variable y. The number $n_{p,j}$ may be computed using the sample mean $\bar{y}$ and variance $s^2$ for the composite variable y using equation (7), where the number of measurements already taken is less than approximately thirty, or (8), where the number of measurements already taken is approximately thirty or more. The result is only an estimation of the number of measurements that will be required to achieve the desired error tolerance, as it is impossible to predict the future behavior of the system being measured based on incomplete information.

Then, in step 318, the system is configured so that experiment p can be executed. Then, in step 320, the experiment p is run to obtain the extra $(n_{p,j} - n_{p,j-1})$ measurements. In step 322, the sample mean $\bar{x}_i$ and the variance $s_i^2$ may be recomputed for the component variable corresponding to experiment p and the statistics for the sample mean $\bar{y}$ and variance $s^2$ for the composite variable y may be recomputed using equations (12) and (13). Then execution proceeds back into step 312, where the decision is made about whether more measurements need to be taken.

Multiple passes through the steps 312-322 of FIG. 3 may be required in order to achieve the desired tolerance constraints for a sought parameter. Thus, assuming the desired tolerance constraints are not met, program flow returns to step 314. In this next pass through the steps 312-322, a new determination is made as to which experiment should be performed (step 314) and for how many additional measurements (step 316), the additional measurements are taken (steps 318 and 320) and new sample mean, variance and error tolerance values are computed (step 322). Then, the newly computed error tolerance values are compared to the desired error tolerance levels (step 312). Eventually, once sufficient experimental runs have been performed in this manner, the determination in step 312 is that the computed values for the sought parameter fall within the desired tolerance constraints. When this occurs, program flow may terminate in a step 324.

It will be apparent that any given model may include more than one parameter, each of which may be directly measurable or may be a composite parameter. Accordingly, the techniques described above may be utilized as is appropriate for each such parameter by performing a complete execution of method 300 for each sought parameter. Where composite parameters have common component parameters, experiments performed for determining one such composite parameter may be reused to determine another such composite parameter. This can save valuable experimentation time. Input and output parameters for prior experiment invocations may be stored in memory 404 (FIG. 4).

Further, a value of a composite parameter may be expressed as a function of another composite parameter. For example, for a disk drive, the parameter "Disk Transfer" is the time to transfer a block of data between one or more disk drive media platters and the disk drive's internal memory buffer, and the parameter "Disk Transfer Overhead" is the amount of time the disk drive requires to perform the overhead operations associated with responding to a request for data from the disk drive. In order to determine the value for "Disk Transfer", a value for "Disk Overhead" may be required. However, the value of "Disk Overhead" may itself be a composite parameter. Each experiment may be performed for different values of its input parameters; for example, Tlookup may be measured for different access sizes. The set of input values on which an experiment is run is called its factor domain. Factor domains should be set by the human modeler in a way that respects dependencies between parameters. For example, if a composite parameter A depends on a composite parameter B, then the factor domains for the component parameters of A should be equal to, or a subset of, the factor domains for the component parameters of B, for every input parameter the component parameters of A and B have in common. Where multiple composite parameters are computed based on the same set of experiments, the priorities assigned to the experiments are preferably based on the contribution or benefit per unit of the experiment to each of the composite parameters that uses the experiment (i.e., those for which the experiment contributes to the determination of the parameter's value). In one aspect, the contribution is computed as a sum of the coefficients of a given experiment on all of the equations included in the model.

Thus, by programmatically obtaining the sought parameters as described herein, the present invention solves the problem of measuring real-system characteristics that are needed for model construction.

Once the model 100 (FIG. 1) has been developed based on the experimental measurements, the model 100 is preferably validated to ensure that the model produces predictions of behavior of the real system that are sufficiently close to the actual behavior of the real system to serve the purpose for the model. This may be performed through conventional model validation techniques in which behavior of the model is compared to behavior of the real system intended to be modeled.

In one aspect, the user may specify error tolerance constraints for measurements taken from the model and for measurements taken from the real system for comparison and model validation purposes. For these measurements, the method 300 of FIG. 3 may be used. Further, for measuring behavior of the real system, results of prior experiments performed in accordance with the method 300 may be reused. For measuring behavior of the model, the method 300 of FIG. 3 may be modified such that the experimental configurations and test vectors are applied to the model in accordance with the method 300 rather than to the real system.

Once values are obtained for validation, comparison of the values for the model 100 may be made against the real system. Let $Y_1, \ldots, Y_k$ be the system outputs resulting from a set of k test vectors. For example, residuals $e_i$ may be computed as a difference between an observed value $\overline{Y}_i$ (from the real system) and a corresponding predicted value $Y_i$ (from the model 100):

$$e_i = Y_i - \overline{Y}_i \tag{19}$$

In one aspect, rather than specifying a confidence interval for each sought parameter, a user may instead specify a maximum allowable error for the model predictions 106. The method 300 may then be applied in which an initial "seed" value for the confidence interval is selected and the method 300 repeated using successively smaller confidence intervals. Each time sought values are obtained that meet the smaller confidence intervals, the model may be reconstructed. Accordingly, the accuracy of the model is progressively increased until the error obtained during validation is less than the specified maximum. Thus, the invention solves the problem of model validation.

In a further aspect, a configuration file is maintained, such as in the system 400, for each component parameter for the model. The following are some attributes that may be included in such a configuration file. These are provided as examples only, using an exemplary syntax derived from the Tcl language. The "syntax" elements are defined using a regular-expression-based language. It will be apparent that the attributes may be altered and that other attributes may be used:

Attribute: constant
Definition: This defines a constant to be used throughout the processing of the corresponding configuration file.
Syntax: constant {<pname> <Tcl-value>}
Example: constant {N 2}
Attribute: experiment
Definition: This specifies an experiment to be run giving, for example, the variable where the result will be stored, a version number (for protecting the user from unintentionally reusing results obtained from prior versions of the same experiment), an initial number of measurements of the experiment to be used to compute estimates of the parameter's distribution, and a time-out value which controls how long one measurement of the experiment will be allowed to take before it is discontinued and considered to have failed.
Syntax:
experiment {<pname>
{version <integer>}
{initialReps <integer>}
{returns <target-value>}
{expArgs {<exp-command-line>}}
{factorList {<factor-name>}}
{targetProg <experiment-program-name>}
{expTimeOut {sec|min|hour}<time>}}
Example:
experiment {deltaDifference_exp
{version 1}
{initial reps 10}
{returns deltaDifference}
expArgs {-d \$onedisk -m 0}}
{factorList {stripeSize}}
{targetProg deltaMin}
{expTimeOut min 30}}
Attribute: totalCoefArray
Definition: This specifies, for example, an array of the normalized sums of the absolute values of each experiment coefficient on all the computations specified for the model.
Syntax: totalCoefArray {{<experiment-name> <total-coef>}+}
Example: totalCoefArray {deltaDifference_exp1 diskOverhead_exp 3 xferRate_exp 2}
Attribute: expTransCost
Definition: This specifies, such as through the transition costs matrix 500 (FIG. 5), the costs of transition between different experiments. As mentioned, the values of the main diagonal may be zero where the same experiment is re-run. Other missing costs may be assumed to have a value of one.
Syntax: expTransCost {{(exp-name1>, <exp-name2>) <tcl-number>}*} where <exp-name1>, <exp-name2>::= <pname>
Example: expTransCost {{cacheOneTime_exp, cacheOffTime_exp) 1} {(cacheOffTime_exp, cacheOnTime_exp) 1}}
Attribute: computation
Definition: This specifies a mathematical expression used to compute the value of a component parameter at a given point in the parameter space.
Syntax: computation {<component-name> <Tcl-math-expression>}
Example:
computation {diskOverhead [[[$randIOtime − $seqIOtime]/($X−1)]+ $deltaDifference]}
Attribute: errorTolerance
Definition: This specifies the error tolerance for the whole component's mean values as a pair of error tolerance and confidence coefficient desired.
Syntax: errorTolerance {<error> <confidence>}
where <error>, <confidence>::= <tcl-number> in [0, 1.0]
Example: errorTolerance {0.05 0.95}
Attribute: uses
Definition: This specifies a list of components used in a component computation.
Syntax: uses {<component-name>*} where <component-name> ::= <pname>

Example: uses {cache_lookup network_xfer}
Experiments may be run as:
<program> <command-line> <input-file><output-file> <dir>
where the <program> is specified in a configuration file. Input factor values may be written into the <input-file> and responses may be made available in the <output-file>. The program may be run in a current working directory and <dir> may be used to keep any files generated by the experiment that need to be preserved.

The input file may contain one line having the following format:
Syntax: <batch-id> <repetitions> {{<factor> <value>}*}}
Example: {1 10 {{x 1} {y 1}}}

The output file is expected to contain two parts: a set of input factors and a set of output responses. Thus, the output file may have the following format:
Syntax: {{<batch-id> <repetitions>}{<factor> <value>}*}} {{<response> <sum-value> <sum-sqr-value>}*}}
Example: {1 10 {{y 2}}}{{respVar 15.8543 33,9881}}

The following is an example of a configuration file:
expDir expPacioliM
maxConc 1
retries 5
errorTolerance {0.05 0.95}
pollPeriod {sec 1}
constant {logFlag −ln}
factor {X1 {enumerated 2 4 6}}
factor {X2 {enumerated 1 3 5}}
factor {X3 {discrete 0 9 3}}
totalCoef {examples1 1 example2 1}
experiment {example 1
{version 1}
{initialRuns 5}
{expArgs {$logFlag}}
{factorList {X1 X2}}
{targetProg ranExpPM1}
experiment {example2
{version 1}
{initialRuns 5}
{expArgs {$logFlag}}
{factorList {X1 X3}}
{targetProg ranExpPM1}}
expTransCost {example2 example1 1} {example2 example1 1}
{1 example1 −1 example2} =>
(1)*example1 + (−1)*example2 = example1 − example2
computation {1 example1 −1 example2}
model {examplePar {polynomial {{1} {X1}}}

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of determining sought parameter values for a model of a data storage system comprising:
performing an initial set of runs of each of a plurality of experiments on the data storage system to obtain an initial set of measurements of system behavior characteristics;
computing a first value for each sought parameter from the initial set of measurements of system behavior characteristics;
determining a number of additional runs of each of the plurality of experiments needed to meet a desired error tolerance constraint for each sought parameter, wherein the number of additional runs is computed from $$n=[t^2*s^2/\delta^2]$$

and t is a value for the two-sided Student's t statistic with (n−1) degrees of freedom at a desired confidence level, and ($\bar{x}\pm\delta$) defines a desired confidence interval;
performing the number of additional runs of each of the plurality of experiments, to obtain additional measurements of system behavior characteristics;
computing a second value for each sought parameter using the initial measurements of system behavior characteristics combined with the additional measurements of system behavior characteristics; and
determining whether the desired error tolerance constraints are met for each sought parameter based on the second computed value for each sought parameter;
wherein, if the desired error tolerance constraints are not met, repeatedly performing the steps of determining a number of additional runs, performing the number of additional runs, computing a subsequent value for each sought parameter, and determining whether the desired error tolerance constraints are met, until the desired error tolerance constraints are met.

2. A method of determining parameter values for a model of a data storage system using one or more composite parameter, comprising:
performing an initial set of runs of each of a plurality of experiments on the data storage system to obtain an initial set of measurements of system behavior characteristics that contribute to a determination of the one or more composite parameter;
determining the one or more composite parameter values;
computing a first standard deviation for each of the component and composite parameter values;
computing a number of additional runs of each of the plurality of experiments needed to meet desired error tolerance constraints for each component and composite parameter value based on the first computed standard deviations, wherein the number of additional runs of each of the plurality of experiments is computed from $$n=[t^2*s^2/\delta^2]$$

where t is a value for the two-sided Student's t statistic with (n−1) degrees of freedom at a desired confidence level, and ($\bar{x}\pm\delta$) defines a desired confidence interval;
performing the number of additional runs of each of the plurality of experiments to obtain additional measurements of system behavior characteristics;
computing a second standard deviation for each component and composite parameter values; and
determining whether the desired error tolerance constraints for each component and composite parameter value are met based on the second standard deviation;
wherein, if the desired error tolerance constraints are not met, repeatedly performing the steps of computing a number of additional runs, performing the number of additional runs, computing a standard deviation and determining whether the desired error tolerance constraints are met.

3. The method according to claim 2, wherein said performing the additional number of runs comprises performing each additional run of the plurality of experiments in a sequence determined according to transition costs.

4. The method according to claim 3, wherein said transition costs are stored in computer memory as a matrix of the transition costs.

5. The method according to claim 2, further comprising assigning a priority to each of the plurality of experiments and placing each experiment in a priority queue according to its assigned priority.

6. The method according to claim 5, wherein said step of computing a number of additional runs comprises selecting a highest priority one of the plurality of experiments and computing the number of additional runs for the highest priority one of the plurality of experiments.

7. The method according to claim 6, further comprising returning the highest priority one of the plurality of experiments to the queue after completing the step of performing the number of additional runs.

8. The method according to claim 7, further comprising holding the highest priority one of the plurality of experiments out of the queue after completing the step of performing the number of additional runs.

9. The method according to claim 5, wherein the priority for each of the plurality of experiments is based on an expected benefit computed for the experiment.

10. The method according to claim 9, wherein the expected benefit for each of the plurality of experiments is related to how much the second standard deviation was reduced by the additional component and composite parameter values.

11. The method according to claim 10, wherein the expected benefit $b_i$ is proportional to $$\frac{(s_T - s_T)/n_s}{s_T}$$

where $s_T$ is the standard deviation of total component and composite parameter values and, $s_f$ is the standard deviation computed from the initial set of component and composite parameter values, and $n_s$ is the number of additional runs.

12. The method according to claim 11, wherein the composite parameter y is computed from component parameters $x_1, x_2, \ldots, x_k$, and is:

$$y = a_1 * x_1 + a_2 * x_2 + \ldots + a_k * x_k.$$

13. The method according to claim 12, wherein $$b_i = \frac{A_i * (s_f - s_T)/n_s}{s_T}$$

and Ai is:

$$A_i = \frac{|a_i|}{\sum_{j=1}^{k} |a_j|}$$

14. A method of determining sought parameter values for a model of a data storage system comprising:
   performing an initial set of runs of each of a plurality of experiments on the data storage system to obtain an initial set of measurements of system behavior characteristics;
   computing a first value for each sought parameter from the initial set of measurements of system behavior characteristics;
   determining a number of additional runs of each of the plurality of experiments needed to meet a desired error tolerance constraint for each sought parameter, wherein the number of additional runs is computed from:

$$n = [z^2 * s^2 / \delta^2]$$

where z is a unit normal variate, and $(\bar{x} \pm \delta)$ defines a desired confidence interval;
   performing the number of additional runs of each of the plurality of experiments, to obtain additional measurements of system behavior characteristics;
   computing a second value for each sought parameter using the initial measurements of system behavior characteristics combined with the additional measurements of system behavior characteristics; and
   determining whether the desired error tolerance constraints are met for each sought parameter based on the second computed value for each sought parameter;
   wherein, if the desired error tolerance constraints are not met, repeatedly performing the steps of determining a number of additional runs, performing the number of additional runs, computing a subsequent value for each sought parameter, and determining whether the desired error tolerance constraints are met, until the desired error tolerance constraints are met.

15. A method of determining parameter values for a model of a data storage system using one or more composite parameter, comprising:
   performing an initial set of runs of each of a plurality of experiments on the data storage system to obtain an initial set of measurements of system behavior characteristics that contribute to a determination of the one or more composite parameter;
   determining the one or more composite parameter values;
   computing a first standard deviation for each of the component and composite parameter values;
   computing a number of additional runs of each of the plurality of experiments needed to meet desired error tolerance constraints for each component and composite parameter value based on the first computed standard deviations, wherein the number of additional runs of each of the plurality of experiments is computed from:

$$n = [z^2 * s^2 / \delta^2]$$

where z is a unit normal variate, and $(\bar{x} \pm \delta)$ defines a desired confidence interval;
   performing the number of additional runs of each of the plurality of experiments to obtain additional measurements of system behavior characteristics;
   computing a second standard deviation for each component and composite parameter value; and
   determining whether the desired error tolerance constraints for each component and composite parameter value are met based on the second standard deviation;
   wherein, if the desired error tolerance constraints are not met, repeatedly performing the steps of computing a number of additional runs, performing the number of additional runs, computing a standard deviation and determining whether the desired error tolerance constraints are met.

* * * * *

UNITED STATES PATENT AND TRADEMARK OFFICE
CERTIFICATE OF CORRECTION

PATENT NO. : 7,505,886 B1
APPLICATION NO. : 10/234889
DATED : March 17, 2009
INVENTOR(S) : Guillermo Alvarez et al.

It is certified that error appears in the above-identified patent and that said Letters Patent is hereby corrected as shown below:

In column 7, line 5, delete "$y=\alpha_1*x_1+\alpha_2*x_2+...+\alpha_k*x_k$" and insert -- $y=a_1*x_1+a_2*x_2+ ... + a_k*x_k$ --, therefor.

In column 7, line 6, delete "$\alpha_1, \alpha_2, ..., \alpha_k$" and insert -- $a_1, a_2, ..., a_k$ --, therefor.

In column 7, line 10, delete "$\mu = \alpha_1*\mu_1+\alpha_2*\mu_2+...+\alpha_k*\mu_k$" and insert -- $\mu = a_1*\mu_1+a_2*\mu_2+ ... +a_k*\mu_k$ --, therefor.

In column 7, line 14, delete "$\sigma^2=\alpha_1^2*\sigma_1^2+\alpha_2^2*\sigma_2^2+...+\alpha_k^2*\sigma_k^2$" and insert -- $\sigma^2=a_1^2*\sigma_1^2+a_2^2*\sigma_2^2+ ... +a_k^2*\sigma_k^2$ --, therefor.

In column 7, line 17, delete "$\bar{y}=\alpha_1*\bar{x}_1+\alpha_2*\bar{x}_2+...+\alpha_k*\bar{x}_k$" and insert -- $\bar{y}=a_1*\bar{x}_1+a_2*\bar{x}_2+ ... +a_k*\bar{x}_k$ --, thereofr.

In column 7, line 21, delete "$s^2=\alpha_1^2*s_1^2+\alpha_2^2*s_2^2+...+\alpha_k^2*s_k^2$" and insert -- $s^2 = a_1^2*s_1^2+a_2^2*s_2^2+ ... + a_k^2*s_k^2$ --, therefor.

In column 8, line 63, delete "$S_1^2$" and insert -- $S_t^2$ --, therefor.

In column 13, line 34, delete "Let $Y_l$," and insert -- Let $Y_i$, --, therefor.

In column 16, line 49, in Claim 2, delete "$(\bar{x}+\delta)$" and insert -- $(\bar{x} \pm \delta)$ --, therefor.

UNITED STATES PATENT AND TRADEMARK OFFICE
CERTIFICATE OF CORRECTION

PATENT NO. : 7,505,886 B1
APPLICATION NO. : 10/234889
DATED : March 17, 2009
INVENTOR(S) : Guillermo Alvarez et al.

It is certified that error appears in the above-identified patent and that said Letters Patent is hereby corrected as shown below:

In column 17, line 32, in Claim 11, delete " $\frac{(s_T - s_{T'})/n_s}{s_T}$ " and insert -- $\frac{(s_{j'} - s_{T'})/n_s}{s_T}$ --, therefor.

Signed and Sealed this

Eighteenth Day of August, 2009

David J. Kappos
*Director of the United States Patent and Trademark Office*